United States Patent
Zhang et al.

(10) Patent No.: US 8,483,559 B2
(45) Date of Patent: Jul. 9, 2013

(54) SYSTEM AND METHOD FOR MONITORING A BRANCHED OPTICAL COMMUNICATION SYSTEM

(75) Inventors: Hongbin Zhang, Marlboro, NJ (US); Haifeng Li, Morganville, NJ (US); Ralph Brian Jander, Freehold, NJ (US)

(73) Assignee: Tyco Electronics Subsea Communications LLC, Eatontown, NJ (US)

( * ) Notice: Subject to any disclaimer, the term of this patent is extended or adjusted under 35 U.S.C. 154(b) by 208 days.

(21) Appl. No.: 12/986,461

(22) Filed: Jan. 7, 2011

(65) Prior Publication Data

US 2012/0177362 A1    Jul. 12, 2012

(51) Int. Cl.
*H04B 10/08* (2006.01)
*H04B 17/00* (2006.01)

(52) U.S. Cl.
USPC ........ 398/9; 398/10; 398/16; 398/17; 398/25; 398/30

(58) Field of Classification Search
None
See application file for complete search history.

(56) References Cited

U.S. PATENT DOCUMENTS

| | | | |
|---|---|---|---|
| 5,969,833 A | 10/1999 | Jensen | |
| 6,535,309 B1 | 3/2003 | Terahara | |
| 7,388,657 B2 | 6/2008 | Abbott | |
| 2002/0063921 A1* | 5/2002 | Terahara et al. | 359/124 |
| 2002/0131116 A1 | 9/2002 | Shimomura et al. | |
| 2007/0177876 A1 | 8/2007 | Ooi et al. | |
| 2010/0290786 A1 | 11/2010 | Abbott | |

OTHER PUBLICATIONS

International Search Report and Written Opinion mailed Mar. 21, 2012 in corresponding PCT Patent Application Serial No. PCT/US12/20457.

* cited by examiner

*Primary Examiner* — Kenneth N Vanderpuye
*Assistant Examiner* — Darren E. Wolf (57) ABSTRACT

A system and method for monitoring an optical communication system. The system may include trunk terminals coupled through a trunk path and a branch terminal coupled the trunk path. A monitoring signal routing device within the branch terminal routes a monitoring signal from a branch-drop path to a branch-add path.

9 Claims, 4 Drawing Sheets

SYSTEM AND METHOD FOR MONITORING A BRANCHED OPTICAL COMMUNICATION SYSTEM

TECHNICAL FIELD

The present disclosure relates to communication systems, and, more particularly, to a system and method for monitoring a branched optical communication system.

BACKGROUND

A branched optical communication system may include a relatively long trunk path that may be terminated at a transmitting and/or receiving trunk terminal, and at least one branch terminal coupled to the trunk path through a branch path and a branching unit (BU). Each BU may include one or more optical add/drop multiplexers (OADM). Channels or wavelengths of a wavelength division multiplexed (WDM) signal may be added to and/or dropped from the trunk path via the OADMs to direct optical signals on selected channels to and from the branch terminals.

In long distance optical communication systems, such as an undersea optical cable system, it may be advantageous to monitor the health of the system and particularly the optical paths in the system. For example, line monitoring systems (LMS) can be used to detect faults or breaks in the optical transmission cable, faulty repeaters or amplifiers or other problems with the system. LMS include use of optical time domain reflectometry (OTDR) and high-loss loop-back (HLLB) equipment and techniques.

In general, these LMS systems include line monitoring equipment (LME) that generates a monitoring, or test, signal, e.g. noise or tones, representing a pseudo random bit sequence. The line monitoring equipment may launch the monitoring signal into the outbound path with the information signals. Some portion of the monitoring signal may be returned to the LME and used as a metric to determine the health of the system.

According to an OTDR LMS technique, for example, elements in the outbound path may reflect (e.g., backscatter) portions of the monitoring signal. Backscattered monitoring signal portions may be returned (e.g., on the same outbound path or a different path such as the inbound path) and detected in an OTDR receiver of the LME. The transmission characteristics of each element in the path may also affect the amount of signal reflected at points after that element, for example, by attenuating the monitoring signal or the reflected signal. The magnitude of the backscattered or reflected signal from each element or point along the optical path may be representative of the health of the system.

According to a high-loss loop-back (HLLB) LMS technique, the monitoring signal may be returned to the LME from each coupling point in the path pair through a HLLB path within an amplifier or repeater. The LME may then separate the returned monitoring signals from the data signals, and process the returned monitoring signals to obtain data representing the HLLB loop gain imparted to the monitoring signal in its propagation from the line monitoring equipment, through the HLLB and any intervening optical paths and amplifiers, and back to the line monitoring equipment. Loop gain is the ratio of the magnitude of the detected sample from a given coupling point to the magnitude of the monitoring signal launched into the outbound path. Deviations in HLLB loop gain may indicate a fault in the system.

A challenge associated with LMS operation in branched optical networks is that the monitoring signals can simultaneously return from different network paths, e.g., trunk and branch, making it difficult to assign location to the returning signals. In addition, it may be difficult to interpret loop-gain changes in branched networks because a branch fault can affect trunk loop-gains and a trunk fault can affect branch loop-gains. Thus, within a branched optical network, it may be difficult with present LMS methods to localize and classify a system fault from a single isolated LMS measurement.

BRIEF DESCRIPTION OF DRAWINGS

Features and advantages of the claimed subject matter will be apparent from the following detailed description of embodiments consistent therewith, which description should be considered with reference to the accompanying drawings, wherein:

DETAILED DESCRIPTION

In general, a system and method consistent with the present disclosure enables line monitoring in a branched optical network in a manner that monitors each portion of the trunk and branch paths in the system, i.e. without "dead-zones." The branch terminals in the system may include a monitoring signal routing device configured to receive a monitoring signal on a drop path to the branch terminal and re-route the monitoring signal out of the branch terminal on an add path from the branch terminal. Consistent with the present disclosure, faults in a branched optical network may be efficiently identified and localized.

Figure 1:
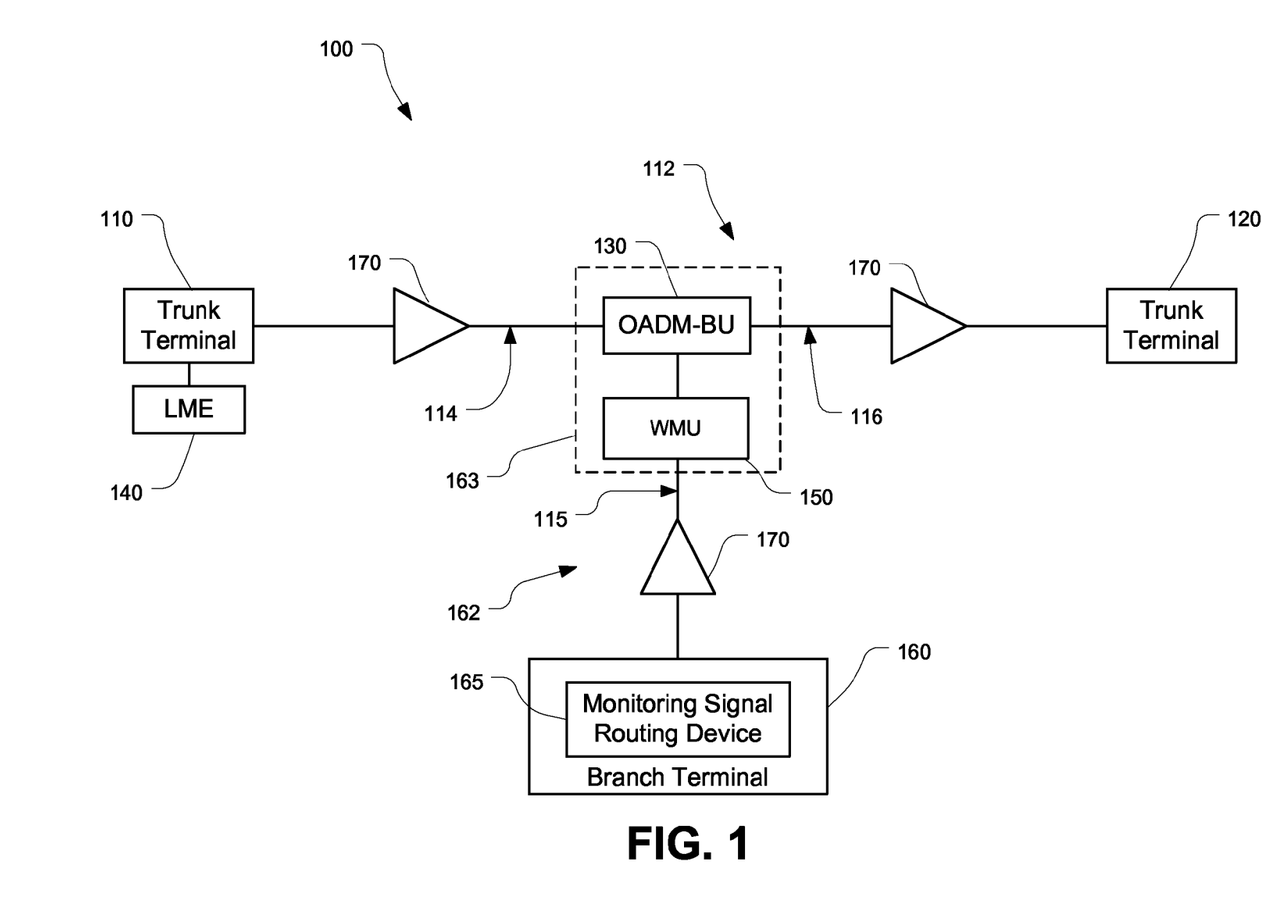
FIG. 1 is a schematic illustration of an optical communication system consistent with the present disclosure.

FIG. 1 illustrates an exemplary branched optical communication system 100 consistent with the present disclosure. The system 100 has been depicted in highly-simplified form for ease of explanation. The illustrated system 100 includes trunk terminals 110 and 120 coupled to a trunk path 112, and a branch terminal 160 coupled to the trunk path 112 through a branch path 162. System 100 may be configured as a long-haul system, e.g. having a length between at least two of the terminals of more than about 600 km, which spans a body of water, e.g. an ocean. The trunk path 112 may thus span between beach landings.

The trunk path 112 and the branch paths 162 may both include a plurality of dual-fiber optical cable segments, e.g. cable segments 114, 115, 116 for carrying optical signals. Each cable segment may include one or more sections of optical fiber cable including optical fiber pairs and one or more repeaters 170. The system 100 may therefore be configured to provide bi-directional communication of optical signals between any of the terminals 110, 120, 160. For ease of explanation, the description herein may refer to transmission from one terminal to another. It is to be understood, however, that the system 100 may be configured for bi-directional or uni-directional communication between any number of the terminals 110, 120, 160.

The components in the trunk 112 and branch 162 paths may include any of a variety of configurations for achieving their intended functionality. The repeaters 170, for example, may include an optical amplifier/repeater configuration that compensates for signal attenuation on the transmission path. For example, one or more of the repeaters may be configured as an optical amplifier, such as an erbium-doped fiber amplifier (EDFA), a Raman amplifier, or a hybrid Raman/EDFA amplifier. Also, one or more of the repeaters may be provided in an optical-electrical-optical configuration that regenerates an optical signal by converting it to an electrical signal, processing the electrical signal and then retransmitting the optical signal.

At least one OADM-BU (branching unit including one or more optical add/drop multiplexers) 130 may be coupled to the trunk path between the trunk terminals 110, 120. The OADM-BU may be associated with a wavelength management unit (WMU) unit 150. The WMU 150 may be integral with the OADM-BU, i.e. incorporated into the housing of the OADM-BU, or may be physically separate therefrom, e.g. by several kilometers. The WMU 150 may be coupled to the branch terminal 160 through the branch path 162. The OADM-BU 130 and WMU 150 together form a branching configuration 163 that directs optical signals to and from the branch path 162 and branch terminal 160, by dropping and adding allocated channel wavelengths.

The WMU 150 may, for example, include wavelength selective elements (e.g., filters) for providing a desired wavelength allocation and may also include optical connections (e.g. optical couplers) for coupling the allocated wavelengths between trunk 112 and branch 162 paths. In general, a WDM signal may originate at one or more of the terminals 110, 120, 160. One or more channels of the WDM signal may be allocated as express channels configured to travel uninterrupted through the trunk path 112 from an originating trunk terminal (e.g., trunk terminal 110 as shown in FIG. 1) through the OADM-BU 130 and WMU 150 and to a receiving trunk terminal (e.g., trunk terminal 120). One or more other channels may be local channels that are added and dropped by the WMU 150 to/from the branch terminal 160.

For example, a signal that originates at trunk terminal 110 may include one or more information signals occupying one or more channels (e.g., express channels and local channels). Likewise, a signal that originates at branch terminal 160 may also include one or more information signals occupying one or more channels (e.g., local channels). Both the trunk and branch signals may be transmitted to WMU 150, e.g. through the OADM-BU 130 in the case of the signals originating from the trunk terminal 110.

Any express channels may be passed from the originating trunk terminal 110 to the trunk path 112 directly through the OADM-BU 130 or WMU 150 without interruption. The WMU 150 may be configured to drop, i.e. extract, one or more local channel wavelengths carrying information signals originating from the trunk terminal 110. The information signals on the dropped local channels may then be passed to the branch terminal 160. WMU 150 may also be configured to add, i.e. insert, one or more local channel wavelengths carrying information signals originating from the branch terminal 160 to the trunk path 112. The resulting WDM optical signal, i.e. including the added information signals, may then be passed onto the trunk path 112 (e.g., onto segment 116 following the OADM-BU 130). One example of an OADM-BU 130 useful in a system consistent with the present disclosure is described in U.S. Patent Application Publication No. US 2010/0290786 the teachings of which are hereby incorporated herein by reference.

To achieve line monitoring in the system 100, one or more of the terminals 110, 120, 160 may include line monitoring equipment (LME) 140 that generates a test, or monitoring, signal, e.g. noise and/or tones, representing a pseudo random bit sequence. In FIG. 1, only terminal 110 is illustrated as including LME 140 for ease of explanation and illustration. The LME 140 may launch a monitoring signal into an outbound fiber path (shown in FIG. 2) of the trunk path 112, which may also carry information signals, e.g. in WDM system. The monitoring signal may be returned to the LME 140 via an inbound fiber path (shown in FIG. 2) of the trunk path 112 from each coupling point in the outbound/inbound path pair through an amplifier or repeater 170.

The LME 140 may be part of a HLLB and/or OTDR LMS that enables tracking of the function and performance of the optical communication system 100. Performance of the entire system 100 can be monitored using the LME to obtain both in-service (when the system is carrying information signals) and out-of-service (when no information signal are being communicated on the system) measurements. The in-service measurements may act as an early-warning system, automatically alerting owners to changes that could affect operation. Out-of-service LMS, e.g. OTDR measurements, may allow fiber faults to be localized accurately. Examples of line monitoring equipment useful as LME 140 in a HLLB or OTDR LMS are described, for example, in U.S. Pat. Nos. 7,388,657 and 5,969,833, the teachings of which are hereby incorporated herein by reference.

Consistent with the present disclosure, the monitoring signal from the LME may be passed through the branching configuration 163 onto a drop fiber of the branch path 162 and to a monitoring signal routing device (MSRD) 165 in the branch terminal 160. The MSRD may be configured to re-route the monitoring signal onto an add fiber of the branch path 162. In one embodiment, for example, the MSRD may include one or more filters for passing at least a portion of monitoring signal from a drop fiber of a first fiber pair to an add fiber of a different fiber pair, thereby providing a "festooned" configuration. In another embodiment, the MSRD may include a path, such as an HLLB, for re-routing at least a portion of the monitoring signal from a drop fiber of a first fiber pair to an add fiber of the same fiber pair, e.g. in a configuration wherein the branch path includes only a single fiber pair. The MSRD thus causes a monitoring signal that originates from LME of a trunk terminal to propagate along the entire branch path and back to the trunk path to enable monitoring of the branch and trunk paths by the LME without missing any segments thereof.

Figure 2:
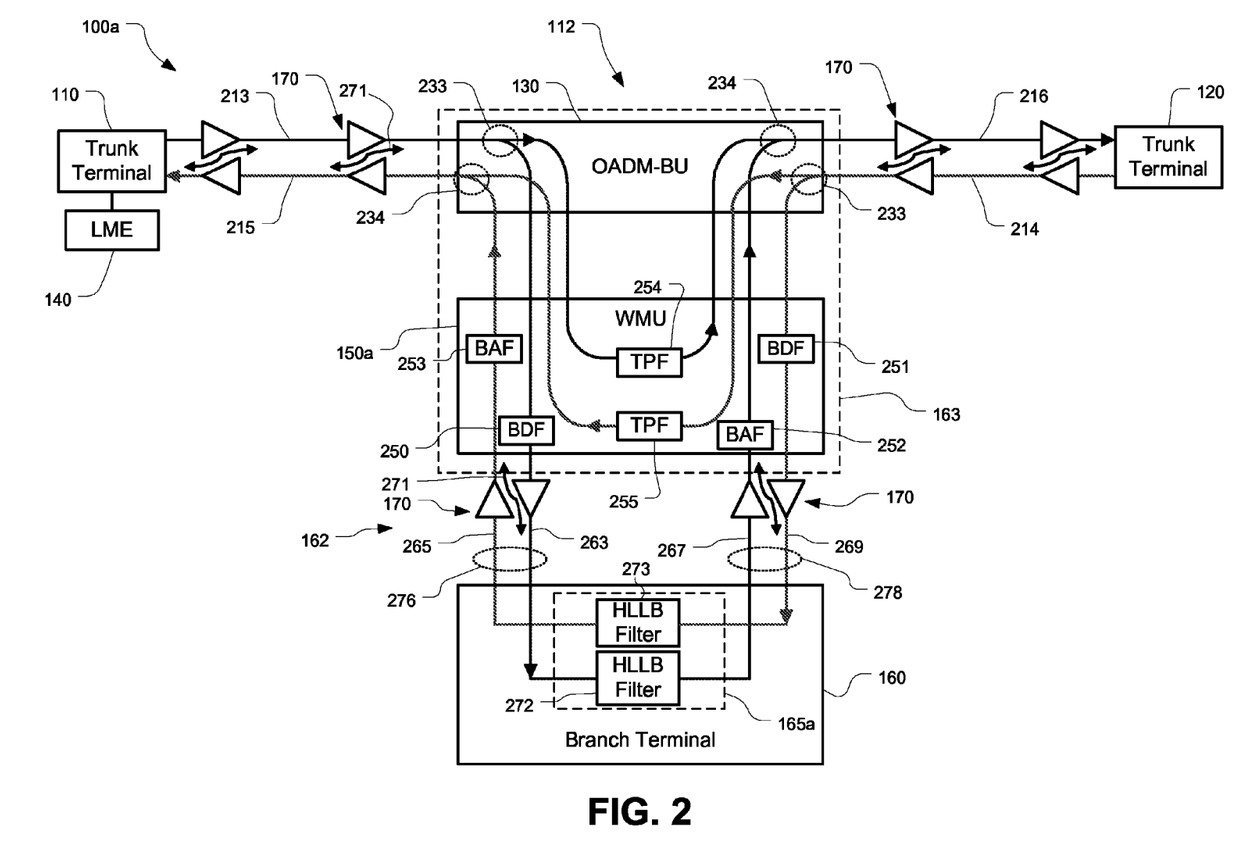
FIG. 2 is a schematic illustration of one embodiment of an optical communication system consistent with the present disclosure.

FIG. 2 is a schematic illustration of one embodiment 100*a* of an optical communication system incorporating an MSRD 165*a* that establishes a festooned configuration consistent with the present disclosure. In the illustrated system, the trunk terminal 110 is coupled to the OADM-BU 130 by at least one associated fiber pair including an outbound fiber path 213 configured to carry optical signals away from the trunk terminal 110 and an inbound fiber path 215 configured to carry optical signals toward the trunk terminal 110. Likewise, the trunk terminal 120 is coupled to the OADM-BU 130 by at least one associated fiber pair including an outbound fiber path 214 configured to carry optical signals away from the trunk terminal 120 and an inbound fiber path 216 configured to carry optical signals toward the trunk terminal 120.

The branch terminal 160 is coupled to a WMU 150*a* by a first branch fiber pair 276 and a second branch fiber pair 278. The first branch fiber pair 276 includes an inbound branch-drop fiber 263 carrying drop-channels transmitted from the trunk terminal 110 to the branch terminal 160 and an outbound branch-add fiber 265 carrying add-channels from the branch terminal 160 to the trunk terminal 110. The second branch fiber pair 278 includes an inbound branch-drop fiber 269 carrying drop-channels transmitted from the trunk terminal 120 to the branch terminal 160 and an outbound branch-add fiber 267 carrying add-channels from the branch terminal 160 to the trunk terminal 120.

In the illustrated exemplary embodiment, the WMU 150a includes three types of filters: trunk-pass filters (TPFs) 254, 255, branch-add filters (BAFs) 251, 253 and branch-drop filters (BDFs) 250,252. In addition to passing and/or rejecting proper signal band signals in the trunk path 112, the TPFs 254, 255 block passage the monitoring signal(s). The BAFs 251, 253 pass monitoring signal(s), as well as information signals flowing between the branch station 160 and the trunk path 112. The BDFs 250, 252 pass the monitoring signal(s), as well as data signals flowing between trunk path 112 and branch station 160. The BDFs 250,252 may also block at least one trunk path 112 wavelength from going to the branch terminal 160 to provide unambiguous trunk path 112 out-of-service outbound OTDR measurements.

In general, WDM trunk signals originating at the trunk terminal 110 may be carried on the outbound fiber path 213 to the OADM-BU 130. The OADM-BU 130 may include active or passive elements, e.g. a splitter 233, for spitting the signals from the trunk terminal 110 onto two paths provided to the WMU 150a. As shown, on one path the trunk signal may be coupled to a trunk pass filter (TPF) 254. The TPF 254 may be configured to pass only express channels (channels intended to pass from the trunk terminal 110 to the trunk terminal 120) to active or passive elements, e.g. coupler 234, configured for combining the express channels onto the inbound fiber path 216 to the trunk terminal 120. On the other path, the trunk signal may be coupled to a branch-drop filter (BDF) 250. The BDF 250 may be configured to pass only drop-channels (channels intended to pass from the trunk terminal 110 to the branch terminal 160) to the branch terminal 160 through the branch-drop path 263.

Likewise, WDM trunk signals originating at the trunk terminal 120 may be carried on the outbound fiber path 214 to the OADM-BU 130. The OADM-BU 130 may include active or passive elements, e.g. a splitter 233, for spitting the signals from the trunk terminal 120 onto two paths provided to the WMU 150a. On one path the trunk signal may be coupled to a TPF 255. The TPF 255 may be configured to pass only express channels (channels intended to pass from the trunk terminal 120 to the trunk terminal 110) to active or passive elements, e.g. coupler 234, configured for combining the express channels onto the inbound fiber path 215 to the trunk terminal 110. On the other path, the trunk signal may be coupled to a BDF 251. The BDF 251 may be configured to pass only drop-channels (channels intended to pass from the trunk terminal 120 to the branch terminal 160) to the branch terminal 160 through the branch-drop path 269.

Branch-add signals from the branch terminal 160 and intended to be passed to the terminal 110 may be coupled from the branch terminal 160 to a branch-add filter (BAF) 253 on the branch-add fiber path 265. The BAF 253 may pass only the branch-add signals to active or passive elements, e.g. coupler 234, configured for combining the branch-add-channels onto the inbound fiber path 215 to the trunk terminal 110. Branch-add signals from the branch terminal 160 and intended to be passed to the terminal 120 may be coupled from the branch terminal 160 to a branch-add filter (BAF) 252 on the branch-add fiber path 267. The BAF 252 may pass only the branch-add signals to an active or passive elements, e.g. coupler 234, configured for combining the branch-add-channels onto the inbound fiber path 216 to the trunk terminal 120.

To facilitate line monitoring consistent with the present disclosure, the MSRD 165a may include first 272 and second 273 HLLB filters, each of which is configured to pass a monitoring signal received at the branch terminal on the branch-drop fiber 263, 269 of one fiber pair 276, 278 through the branch terminal 160 and to the branch-add fiber 265, 267 of the other fiber pair 276,278. In particular, the first HLLB filter 272 is configured to receive a monitoring signal from branch-drop fiber 263 of the fiber pair 276 and pass the monitoring signal through the branching unit 160 and to the branch-add fiber 267 of the fiber pair 278. The second HLLB filter 273 is configured to receive a monitoring signal from branch-drop fiber 269 of the fiber pair 278 and pass the monitoring signal through the branching unit 160 and to the branch-add fiber 265 of the fiber pair 276.

Figure 3:
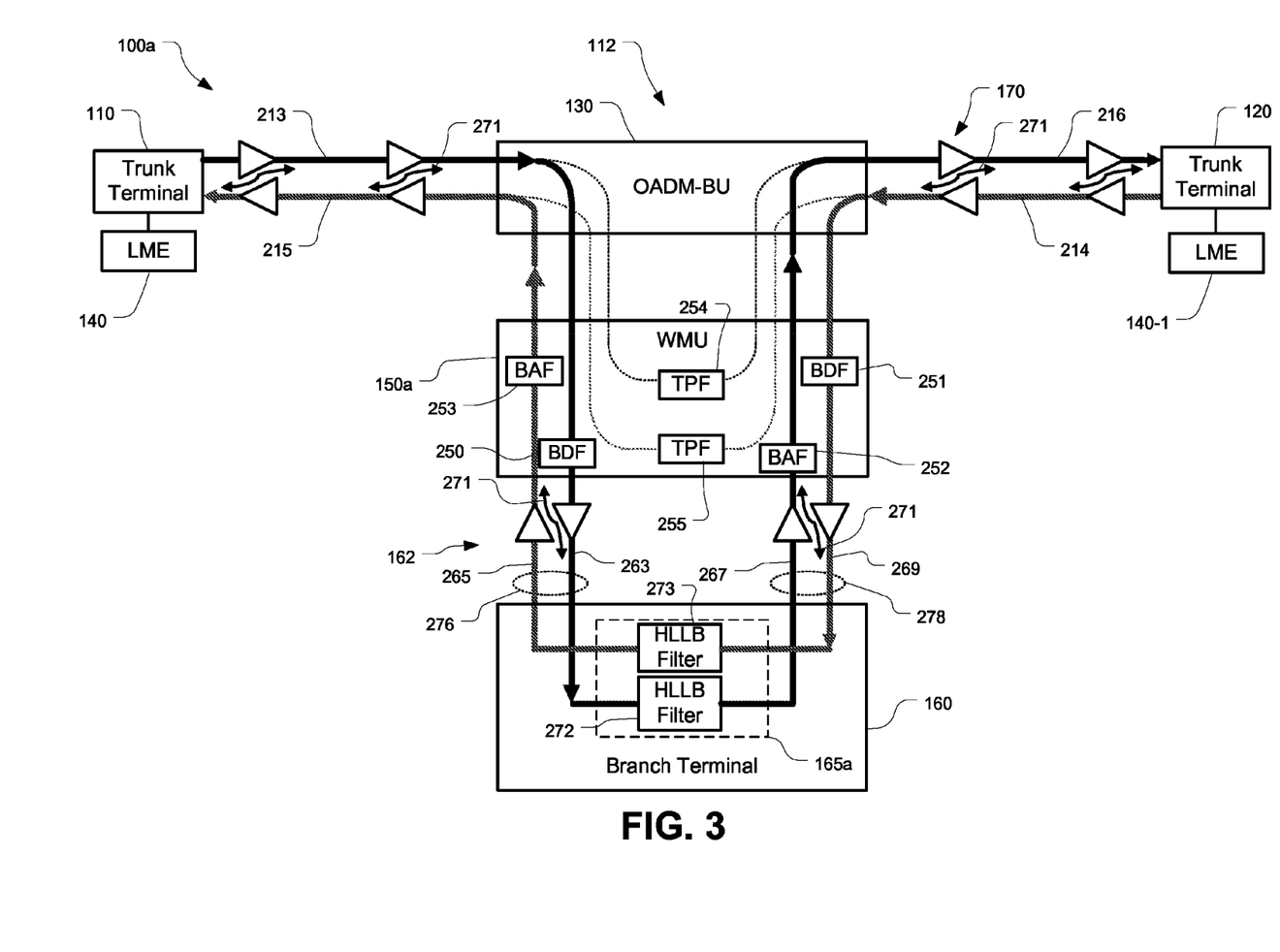
FIG. 3 illustrates the path of a monitoring signal through the optical communication system shown in FIG. 2.

The MSRD 165a thus allows a monitoring signal generated at the trunk terminal 110 and/or 120 to be routed through the branching unit 160 and to the other terminal, and allows loop-back signals from HLLB paths in the system to loop the monitoring signal back to the terminal from which the monitoring signal originated. FIG. 3, for example, includes darkened arrows illustrating the path taken by in-service monitoring signals generated at the LME 140 associated with terminal 110 and LME 140-1 associated with terminal 120. As shown in FIG. 3, a monitoring signal originating at LME 140 may be provided on the outbound fiber path 213, to the OADM-BU 130, and to the BDF 250. The monitoring signal may be blocked by the TPF 254, but may be within the passband of the BDF 250 so that it passes through the BDF 250 to the branch-drop path 263 of the fiber pair 276 and to the first HLLB filter 272. The first HLLB filter 272 may pass the monitoring signal to the branch-add path 267 of the fiber pair 278 and to the BAF 252. The monitoring signal may be within the passband of the BAF 252 and may pass to the OADM-BU 130 and onto the inbound fiber path 216 to the trunk terminal 120.

A monitoring signal originating at LME 140-1 may be provided on the outbound fiber path 214, to the OADM-BU 130, and to the BDF 251. The monitoring signal may be blocked by the TPF 255, but may be within the passband of the BDF 251 so that it passes through the BDF 251 to the branch-drop path 269 of the fiber pair 278 and to the second HLLB filter 273. The second HLLB filter 273 may pass the monitoring signal to the branch-add path 265 of the fiber pair 276 and to the BAF 253. The monitoring signal may be within the passband of the BAF 253 and may pass to the OADM-BU 130 and onto the inbound fiber path 215 to the trunk terminal 110.

A portion of the monitoring signal transmitted by an LME 140, 140-1, may be looped back to the LME by an HLLB path at one or more coupling locations including an HLLB path. For example, a portion of the monitoring signal generated by LME 140 may be looped back to LME 140 by an HLLB path 271 within each repeater 170. Once the monitoring signal generated by an LME 140, 140-1 passes through the branching unit and through one of the HLLB filters 272, 273, it is returned to the LME 140, 140-1, through a HLLB path 271 and the other one of the HLLB filters 272, 273.

With a system consistent with the present disclosure, a monitoring signal generated by an LME 140, 140-1 may pass through each portion of the trunk 112 and branch 162 paths within the network 100a, thereby facilitating monitoring of the entire network. Also, in a system consistent with the present disclosure it is not required that an LME be located at each branch station for in-service monitoring. In some cases, however, e.g. where many OADM-BUs are deployed, it may be advantageous to locate LME at one or more of the branch stations to improve fault isolation capability when a cable break isolates one of the trunk stations from the network. Also, in systems where automatic signature analysis is used to determine the location or nature of a fault, signature analysis of faults in the vicinity of the OADM-BU 130 may be readily detected and classified without making multiple, coordinated LMS measurements from LME at various trunk and branch stations.

Also, if there are severe faults in the system 100a, e.g. as detected by in-service monitoring as described above, a system consistent with the present disclosure may be utilized in an out-of-service mode to localize fiber breaks within a span since all portions of the network may be sensed with a monitoring signal such as an OTDR signal. For example, for any fault within the trunk path 112, the LME 140 may generate a monitoring OTDR signal on the trunk path 112 at a wavelength within the passband of the TPFs 254, 255, but outside of the passbands of the BDFs 250, 251. As such, the monitoring signal may pass through the trunk path 112, OADM-BU 130 and WMU 150a between the trunk terminals 110 and 120, but may not enter the branch path 162, to facilitate isolation of faults in the trunk path 112. In addition, or alternatively, the LME 140 may generate a monitoring OTDR signal on the trunk path at a wavelength within the passband of the BDFs 250, 251, but outside of the passbands of the TPFs 254, 255. As such, the monitoring signal may pass through the trunk path, OADM, WMU and branch path between the trunk terminals 110 and 120, but may not pass through the TPFs. Also, fault within one of the branch fiber pairs 276, 278 may be addressed by a monitoring signal generated by an LME (not shown) at the branch terminal 160.

Figure 4:
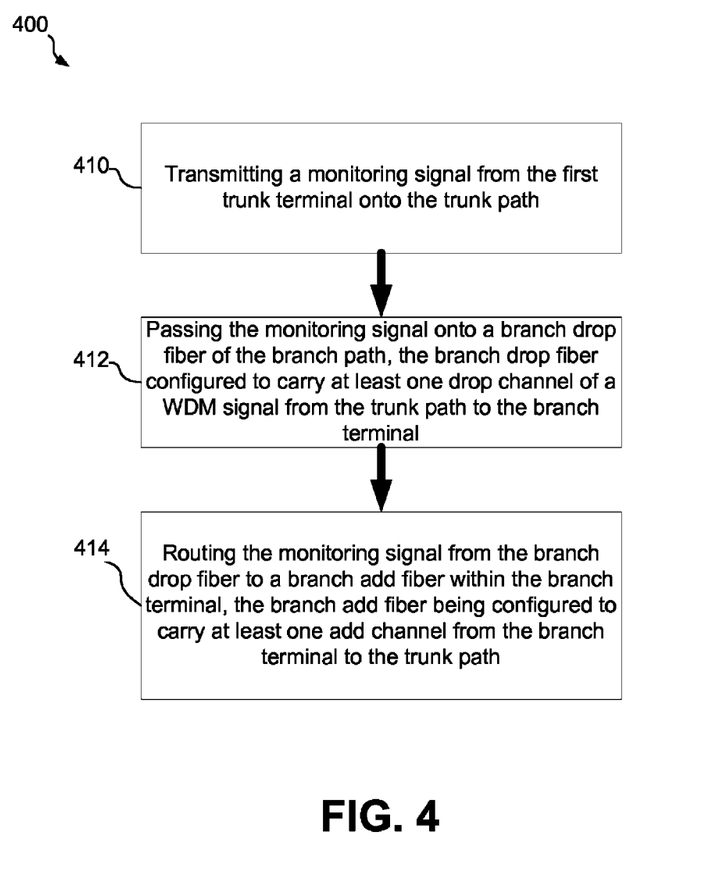
FIG. 4 is a block flow diagram illustrating an exemplary method consistent with the present disclosure.

FIG. 4 is a block flow diagram illustrating an exemplary method 600 consistent with the present disclosure. The illustrated block flow diagram may be shown and described as including a particular sequence of steps. It is to be understood, however, that the sequence of steps merely provides an example of how the general functionality described herein can be implemented. The steps do not have to be executed in the order presented unless otherwise indicated.

As shown in FIG. 4, in a method 400 of monitoring a branched optical communication system including first and second trunk terminals coupled to a trunk path and a branch terminal coupled to the trunk path through a branching configuration and a branch path consistent with the present disclosure, a monitoring signal may be transmitted 410 from the first trunk terminal onto the trunk path. The monitoring signal may be passed 412 onto a branch-drop fiber of the branch path. The branch-drop fiber may be configured to carry at least one drop-channel of a WDM signal from the trunk path to the branch terminal. The monitoring signal may then be routed 414 from the branch-drop fiber to a branch-add fiber within the branch terminal. The branch-add fiber may be configured to carry at least one add-channel from the branch terminal to the trunk path.

Thus, according to one aspect of the present disclosure, there is provided a wavelength division multiplexed (WDM) optical system including a branch terminal coupled to a trunk path through a branch path and a branching configuration. The branching configuration may be configured to pass a monitoring signal and at least one drop-channel of a WDM signal to the branch terminal and to insert the monitoring signal and at least one add-channel from the branch terminal onto the trunk path. The branch path may include at least one branch-drop fiber for carrying the monitoring signal and the at least one drop-channel from the trunk path to the branch terminal and at least one branch-add fiber for carrying the monitoring signal and the at least one add-channel from the branch terminal to the trunk path. The system further includes a monitoring signal routing device disposed in the branch terminal. The monitoring signal routing device may be configured to route the monitoring signal from the at least one branch-drop fiber to the at least one branch-add fiber to thereby return the monitoring signal to the trunk path.

According to another aspect of the disclosure, there is provided a wavelength division multiplexed (WDM) optical system including: a first trunk terminal coupled to a second trunk terminal through a trunk path, the first terminal being configured for transmitting a WDM signal on the trunk path; line monitoring equipment configured for generating a monitoring signal to be transmitted on the trunk path; and a branch terminal coupled to the trunk path through a branch path and a branching configuration. The branching configuration may be configured to pass the monitoring signal and at least one drop-channel of the WDM signal to the branch terminal and to insert the monitoring signal and at least one add-channel from the branch terminal onto the trunk path, and to pass the monitoring signal and at least one second terminal drop-channel transmitted on the trunk path by the second trunk terminal to the branch terminal and to insert the monitoring signal and at least one second terminal add-channel from the branch terminal onto the trunk path. The branch path may include a first fiber pair and a second fiber pair. The first fiber pair may include a first branch-drop fiber for carrying the monitoring signal and the at least one drop-channel from the trunk path to the branch terminal and a first branch-add fiber for carrying the monitoring signal and the at least one add-channel from the branch terminal to the trunk path. The second fiber pair may include a second branch-drop fiber for carrying the monitoring signal and the at least one second terminal drop-channel from the trunk path to the branch terminal and a second branch-add fiber for carrying the monitoring signal and the at least one second terminal add-channel from the branch terminal to the trunk path. The system may further include a monitoring signal routing device disposed in the branch terminal. The monitoring signal routing device may be configured to route the monitoring signal from the at least one branch-drop fiber to the second branch-add fiber, and to route the monitoring signal from the second branch-drop fiber to the at least one branch-add fiber.

According to another aspect of the present disclosure, there is provided a method of monitoring a branched optical communication system including first and second trunk terminals coupled to a trunk path and a branch terminal coupled to the trunk path through a branching configuration and a branch path, the method including: transmitting a monitoring signal from the first trunk terminal onto the trunk path; passing the monitoring signal onto a branch-drop fiber of the branch path, the branch-drop fiber configured to carry at least one drop-channel of a WDM signal from the trunk path to the branch terminal; and routing the monitoring signal from the branch-drop fiber to a branch-add fiber within the branch terminal, the branch-add fiber being configured to carry at least one add-channel from the branch terminal to the trunk path.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

All definitions, as defined and used herein, should be understood to control over dictionary definitions, definitions in documents incorporated by reference, and/or ordinary meanings of the defined terms.

The term "coupled" as used herein refers to any connection, coupling, link or the like by which signals carried by one system element are imparted to the "coupled" element. Such "coupled" devices are not necessarily directly connected to one another and may be separated by intermediate components or devices that may manipulate or modify such signals.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

What is claimed is:

1. A wavelength division multiplexed (WDM) optical system comprising:
a first trunk terminal coupled to a second trunk terminal through a trunk path, said first terminal being configured for transmitting a WDM signal on said trunk path;
line monitoring equipment configured for generating a first monitoring signal having a first wavelength and a second monitoring signal having a second wavelength different from said first wavelength to be transmitted on said trunk path;
a branch terminal coupled to said trunk path through a branch path and a branching configuration,
said branching configuration configured to pass said first monitoring signal and at least one drop-channel of a WDM signal transmitted on said trunk path from said trunk path to said branch terminal and to insert said first monitoring signal and at least one add-channel from said branch terminal onto said trunk path,
said branch path comprising at least one branch-drop fiber for carrying said first monitoring signal and said at least one drop-channel from said trunk path to said branch terminal and at least one branch-add fiber for carrying said first monitoring signal and said at least one add-channel from said branch terminal to said trunk path;
said branching configuration configured to pass said second monitoring signal through said branching configuration and onto said trunk path without placing said second monitoring signal on said branch path; and
a monitoring signal routing device disposed in said branch terminal, said monitoring signal routing device being configured to route said first monitoring signal from said at least one branch-drop fiber to said at least one branch-add fiber to thereby return said first monitoring signal to said trunk path.

2. The system of claim 1 wherein:
said branching configuration is configured to pass said first monitoring signal and at least one second terminal drop-channel transmitted on said trunk path by said second trunk terminal to said branch terminal and to insert said first monitoring signal and at least one second terminal add-channel from said branch terminal onto said trunk path;
said branch path comprises a first fiber pair and a second fiber pair, said first fiber pair comprising said at least one branch-drop fiber and said at least one branch-add fiber;
said second fiber pair comprising a second branch-drop fiber for carrying said first monitoring signal and said at least one second terminal drop-channel from said trunk path to said branch terminal and a second branch-add fiber for carrying said first monitoring signal and said at least one second terminal add-channel from said branch terminal to said trunk path; and
said monitoring signal routing device is configured to route said first monitoring signal from said at least one branch-drop fiber to said second branch-add fiber, and to route said first monitoring signal from said second branch-drop fiber to said at least one branch-add fiber.

3. The system of claim 2, wherein said monitoring signal routing device comprises a first filter coupling said at least one branch-drop fiber to said second branch-add fiber, and a second filter coupling said second branch-drop fiber to said at least one branch-add fiber.

4. A wavelength division multiplexed (WDM) optical system comprising:
a first trunk terminal coupled to a second trunk terminal through a trunk path, said first terminal being configured for transmitting a WDM signal on said trunk path;
line monitoring equipment configured for generating a first monitoring signal having a first wavelength and a second monitoring signal having a second wavelength different from said first wavelength to be transmitted on said trunk path;
a branch terminal coupled to said trunk path through a branch path and a branching configuration,
said branching configuration configured to pass said first monitoring signal and at least one drop-channel of said WDM signal to said branch terminal and to insert said first monitoring signal and at least one add-channel from said branch terminal onto said trunk path, and to pass said first monitoring signal and at least one second terminal drop-channel transmitted on said trunk path by said second trunk terminal to said branch terminal and to insert said first monitoring signal and at least one second terminal add-channel from said branch terminal onto said trunk path;
said branch path comprising a first fiber pair and a second fiber pair, said first fiber pair comprising a first branch-drop fiber for carrying said first monitoring signal and said at least one drop-channel from said trunk path to said branch terminal and a first branch-add fiber for carrying said first monitoring signal and said at least one add-channel from said branch terminal to said trunk path, said second fiber pair comprising a second branch-drop fiber for carrying said first monitoring signal and said at least one second terminal drop-channel from said trunk path to said branch terminal and a second branch-add fiber for carrying said first monitoring signal and said at least one second terminal add-channel from said branch terminal to said trunk path;

said branching configuration configured to pass said second monitoring signal through said branching configuration in a direction from said first trunk terminal to said second trunk terminal and in a direction from said second trunk terminal to said first trunk terminal without placing said second monitoring signal on said branch path; and a monitoring signal routing device disposed in said branch terminal, said monitoring signal routing device being configured to route said first monitoring signal from said at least one branch-drop fiber to said second branch-add fiber, and to route said first monitoring signal from said second branch-drop fiber to said at least one branch-add fiber.

5. The system of claim 4, wherein said monitoring signal routing device comprises a first filter coupling said at least one branch-drop fiber to said second branch-add fiber, and a second filter coupling said second branch-drop fiber to said at least one branch-add fiber.

6. A method of monitoring a branched optical communication system including first and second trunk terminals coupled to a trunk path and a branch terminal coupled to the trunk path through a branching configuration and a branch path, the method comprising:

transmitting a first monitoring signal having a first wavelength from the first trunk terminal onto the trunk path;

passing said first monitoring signal onto a branch-drop fiber of the branch path, the branch-drop fiber configured to carry at least one drop-channel of a WDM signal from the trunk path to the branch terminal;

routing said first monitoring signal from said branch-drop fiber to a branch-add fiber within the branch terminal, said branch-add fiber being configured to carry at least one add-channel from the branch terminal to the trunk path;

transmitting a second monitoring signal having a second wavelength from the first trunk terminal onto the trunk path; and passing said second monitoring signal through the branching configuration toward said second terminal without placing said second monitoring signal on said branch path.

7. The method of claim 6, wherein said WDM signal is transmitted by said first trunk terminal and wherein said branch-drop fiber and said branch-add fiber form single fiber pair associated with the first trunk terminal, said branch-add fiber configured to carry said at least one add-channel from the branch terminal to the trunk path for transmission to said first trunk terminal.

8. The method of claim 6, said method further comprising routing said first monitoring signal from said branch-drop fiber to said branch-add fiber within the branching configuration.

9. The method of claim 6, wherein said WDM signal is transmitted by said first trunk terminal and wherein said branch-drop fiber and said branch-add fiber are associated with first and second fiber pairs, respectively, said branch-add fiber configured to carry said at least one add-channel from the branch terminal to the trunk path for transmission to the second trunk terminal.

* * * * *